United States Patent
Hoshi et al.

(10) Patent No.: US 10,059,861 B2
(45) Date of Patent: *Aug. 28, 2018

(54) METHOD OF REPAIRING OR REINFORCING A TARGET STRUCTURE

(71) Applicant: DAI NIPPON PRINTING CO., LTD., Tokyo-to (JP)

(72) Inventors: Kentaro Hoshi, Ibaraki (JP); Kazuki Tsukiyama, Chiba (JP); Sotaro Ban, Chiba (JP); Takahisa Taniguchi, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 331 days.

This patent is subject to a terminal disclaimer.

(21) Appl. No.: 14/686,116

(22) Filed: Apr. 14, 2015

(65) Prior Publication Data
US 2015/0307749 A1    Oct. 29, 2015

(30) Foreign Application Priority Data
Apr. 23, 2014  (JP) .................. 2014-089492

(51) Int. Cl.
| | |
|---|---|
| *B32B 41/00* | (2006.01) |
| *C09J 5/02* | (2006.01) |
| *C09J 5/00* | (2006.01) |
| *C09J 7/00* | (2018.01) |

(52) U.S. Cl.
CPC . *C09J 5/02* (2013.01); *C09J 5/00* (2013.01); *C09J 7/00* (2013.01); *C09J 2201/606* (2013.01); *C09J 2205/31* (2013.01); *C09J 2433/00* (2013.01); *C09J 2463/00* (2013.01)

(58) Field of Classification Search
CPC ......... C09J 5/02; C09J 7/00; C09J 5/00; C09J 2433/00; C09J 2463/00; C09J 2201/606; C09J 2205/31

USPC .............. 156/64, 322, 350, 378, 379, 379.6
See application file for complete search history.

(56) References Cited

U.S. PATENT DOCUMENTS

| | | | |
|---|---|---|---|
| 2008/0251201 A1* | 10/2008 | Sikkel | C08J 5/121 156/330 |
| 2009/0246915 A1 | 10/2009 | Ichikawa et al. | |
| 2012/0288659 A1 | 11/2012 | Hoshi et al. | |
| 2017/0120547 A1* | 5/2017 | Hoshi | B29C 73/10 |

FOREIGN PATENT DOCUMENTS

| | | |
|---|---|---|
| EP | 0 971 011 A2 | 1/2000 |
| JP | H08-218646 A | 8/1996 |
| JP | H10-120996 A | 5/1998 |
| JP | H10-338851 A | 12/1998 |
| JP | 2004-027718 A | 1/2004 |
| JP | 2010-144360 A | 7/2010 |
| WO | 03/017363 A1 | 2/2003 |
| WO | 2011/083835 A1 | 7/2011 |
| WO | 2014/007341 A1 | 1/2014 |

OTHER PUBLICATIONS

Mar. 21, 2014 article in Nikkan Kogyo Shimbun, "Reduction of Concrete Repairing Steps".
Jan. 9, 2018 Office Action issued in Japanese Patent Application No. 2014-089492.

* cited by examiner

*Primary Examiner* — Michael N Orlando
*Assistant Examiner* — Joshel Rivera
(74) *Attorney, Agent, or Firm* — Oliff PLC (57) ABSTRACT

A method of repairing or reinforcing a target structure includes preparing an adhesive sheet having at least an adhesive layer and a repairing or reinforcing material, irradiating the adhesive sheet with ionizing radiation, and attaching the adhesive layer to the target structure after the irradiation with the ionizing radiation.

17 Claims, 4 Drawing Sheets

METHOD OF REPAIRING OR REINFORCING A TARGET STRUCTURE

CROSS-REFERENCE TO RELATED APPLICATIONS

This application is based upon and claims the benefit of priority from prior Japanese Patent Application No. 2014-089492, filed Apr. 23, 2014, the entire contents of which are incorporated herein by reference.

BACKGROUND

1. Technical Field

The disclosure relates to a method of repairing or reinforcing a target structure, a method of producing a repaired or reinforced target structure, and an adhesive sheet and a method of manufacturing thereof.

2. Description of the Related Art

Social infrastructure facilities have been developed with national economic growth such as highways, water control facilities, sewage line systems, port and harbor facilities, residential houses, parks, revetments, airports, or government buildings. These social infrastructure facilities are gradually getting older as time goes by. However, it is difficult to rebuild all of the social infrastructure facilities at the same time. Therefore, infrastructure improvements are extending to the social infrastructure facilities step by step as the social infrastructure facilities waiting to be rebuilt are repaired or reinforced.

Infrastructure improvement by repair or reinforcement is a matter to urgently be dealt with from the viewpoint of safety. However, certain problems are being encountered, such as: (A) a large amount of each deteriorated social infrastructure facility needs to be repaired or reinforced; (B) a great deal of labor and time are necessary for repairing or reinforcing operations and inspection operations such as visual inspection tests and hammering tests; (C) the above operations are difficult for operators to effectively carry out because the protocols for the above operations are not standardized; and (D) a large amount of cost is necessary for the infrastructure improvements.

Methods of repairing or reinforcing a concrete structure in a tunnel have been proposed. For example, one method is to apply an adhesive material or a coating material more than once to a target area of a concrete structure. Another method is to attach a repairing or reinforcing sheet to a target area of a concrete structure. In particular, a repairing or reinforcing sheet has been preferably used in order to prevent penetration of deterioration causing factors such as oxygen, carbon dioxide, and chloride ions into a concrete structure. Therefore, different methods of repairing or reinforcing a concrete structure by using a repairing or reinforcing sheet have been proposed.

Japanese Patent Application 2010-144360 discloses a method of repairing or reinforcing a concrete structure. The method is accomplished by the following steps: a step of preparing a repairing or reinforcing sheet including a middle layer having a resin sheet, and side layers having a fabric material on each side of the middle layer; a step of attaching the repairing or reinforcing sheet to a concrete structure by means of an adhesive material with one side of the side layers contacting a concrete structure; and a step of applying a coating material to the other side of the side layers. According to Japanese Patent Application 2010-144360, this can prevent the repairing or reinforcing sheet from falling before the adhesive material has been completely cured, and can provide a high quality operation even if the target concrete structure is vertical to the ground, or the adhesive sheet is placed on a ceiling. Furthermore, the coating material can be applied without waiting for the adhesive material to cure because the middle layer completely separates the adhesive material from the coating material.

Japanese Patent Application 2004-027718 discloses a repairing or reinforcing sheet. The sheet comprises a protective layer and a coated adhesive layer having a pressure-sensitive adhesive or hot-melt adhesive on a side facing the target concrete structure. According to Japanese Patent Application 2004-027718, this can reduce the time and effort needed for repairing or reinforcing a concrete structure, and can provide quality stability by attaching the repairing or reinforcing sheet to a target concrete structure in a workplace.

The above related methods, however, cannot prevent an adhesive material from sticking to an operator's hand or face during a measuring operation in the case that a liquid adhesive material is used. As a result the related methods burden operators with difficulty dealing with a liquid adhesive material. Additionally, with these methods, operators have to cure an adhesive layer after attaching it to concrete, and therefore they must carry a heating device or an ultraviolet light irradiation device into a workspace and must apply heat or ultraviolet light to the ceiling or wall in the case a photo-curable adhesive layer or a thermosetting adhesive layer is used. Additionally, with these methods, an opaque substrate cannot be used in the case that a photo-curable adhesive layer is used.

One object of the present invention is to provide a technique capable of reducing the time and effort needed for repairing or reinforcing a target structure.

BRIEF SUMMARY

According to a first embodiment, there is provided a method of repairing or reinforcing a target structure comprising the steps of: preparing an adhesive sheet comprising at least an adhesive layer having a first side and a second side, and a repairing or reinforcing material configured to support the adhesive layer; irradiating the adhesive sheet with an ionizing radiation so as to initiate a curing reaction of the adhesive layer; and attaching the first side of the adhesive layer to the target structure after the irradiating step.

According to a second embodiment, there is provided a method of manufacturing an adhesive sheet comprising the steps of: forming an adhesive layer to be applied to a separation sheet, the adhesive layer comprising an ionizing radiation curable resin and a compound configured to release a polymerization initiator by irradiation with ionizing radiation; irradiating the adhesive sheet with ionizing radiation so as to initiate a curing reaction of the adhesive layer; and preserving the adhesive sheet at a low temperature after the irradiating step.

According to a third embodiment, there is provided a method of producing a repaired or reinforced target structure comprising the steps of: determining an area to be repaired or reinforced; and repairing or reinforcing the area according to the above method.

According to a fourth embodiment, there is provided an adhesive sheet for repairing or reinforcing a target structure comprising: an adhesive layer having an ionizing radiation curable resin and a compound configured to release a polymerization initiator by irradiation of an ionizing radiation, the adhesive layer having a first side and a second side; a separation sheet provided on at least the first side of the adhesive layer; and a repairing or reinforcing material configured to support the adhesive layer.

The disclosed embodiments make it possible for operators to effectively conduct repairing or reinforcing work for the target structure, and to reduce operation time.

DETAILED DESCRIPTION

Preferred embodiments are disclosed below. The embodiments include a method of repairing or reinforcing a target structure, a method of producing a repaired or reinforced target structure, an adhesive sheet and a method of manufacturing an adhesive sheet. Exemplary embodiments of the present invention are described herein. It should be noted that these exemplary embodiments are merely examples and the present invention is not limited to the detailed embodiments.

Method of Repairing or Reinforcing a Target Structure

One embodiment is a method of repairing or reinforcing a target structure and will be explained below with reference to FIGS. 1A to 4B. The method of repairing or reinforcing a target structure includes a step of preparing an adhesive sheet comprising at least an adhesive layer and a repairing or reinforcing material (also described as the "preparing step" below), a step of irradiating the adhesive sheet with ionizing radiation so as to initiate a curing reaction of the adhesive layer (also described as the "irradiating step" below), and a step of attaching the adhesive layer to the target structure (also described as the "attaching step" below). Furthermore, the method of repairing or reinforcing a target structure may include a step of shielding the adhesive layer from the irradiation with ionizing radiation after the preparing step (also described as the "shielding step" below), and a step of preserving the adhesive sheet at a low temperature after the irradiating step (also described as the "preserving step" below).

According to the method of repairing or reinforcing a target structure, the adhesive sheet 10 will be attached to the target structure after initiating the curing reaction of the adhesive layer 2. Subsequently, no intentional operation for curing the adhesive layer 2 need be done. The adhesive layer 2 will have bonded to the target structure while operators are running or arranging the next operation. As a result, this can reduce the time and effort needed for repair or reinforcement. In particular, the method of repairing or reinforcing a target structure is valuable in the situation where operators have to efficiently and quickly carry out a repairing or reinforcing operation (e.g., night-time construction of a tunnel, highway or railway).

(Target Structure)

The target structure is the object to be repaired or reinforced. Examples of target structure include bridges, tunnels, highways, dams, sewage line systems, port and harbor facilities, residential houses, commercial facilities, government facilities, parks, water control facilities, airports, and revetments. A method of repairing or reinforcing a target structure made of concrete will be illustrated below as one example.

(Preparing Step)

The adhesive sheet 10 having the adhesive layer 2 and the repairing or reinforcing material 3 is prepared in the preparing step. The adhesive layer 2 is capable of bonding to the target structure. The curing reaction of the adhesive layer 2 can be initiated by irradiation with ionizing radiation (discussed below), and can gradually continue under the ambient temperature of the structure (also described as the "ambient temperature" below) without any further active curing treatment by the operator(s). The adhesive layer 2 may include a delay-curing adhesive.

(Irradiating Step)

The adhesive sheet 10 is irradiated with ionizing radiation so as to initiate the curing reaction of the adhesive layer 2 in the irradiating step.

The irradiation with ionizing radiation is carried out not after the adhesive sheet 10 has been attached to the target structure but before the adhesive sheet 10 is attached to the target structure. Therefore, the irradiation with ionizing radiation can be carried out on the level ground or in a wide workspace. Furthermore, the irradiation with ionizing radiation can be carried out in a Roll-to-Roll manner by using a stationary ionizing irradiation device. Additionally, the irradiation with ionizing radiation can be carried out by exposing the adhesive sheet 10 to sunlight. The ionizing radiation is produced by electro-magnetic waves having an energy greater than or equal to the energy of ultraviolet light. The ionizing radiation includes, for example, ultraviolet light, extreme ultraviolet light, X-rays, and/or electron beams. The ionizing radiation includes the ultraviolet light in sunlight. As described herein, the ionizing radiation does not exclude the existence of electro-magnetic waves, the energy of which is less than the energy of ultraviolet light.

Ultraviolet light, which has a wavelength range of 300 nm to 370 nm, may be used in such a manner that the accumulated amount of ultraviolet light on respective sides is greater than or equal to 50 $mJ/cm^2$ and less than or equal to 3000 $mJ/cm^2$. Furthermore, the accumulated amount of ultraviolet light could be any value within that range, such as 50 $mJ/cm^2$, 100 $mJ/cm^2$, 500 $mJ/cm^2$, 1000 $mJ/cm^2$, 1500 $mJ/cm^2$, 2000 $mJ/cm^2$, 2500 $mJ/cm^2$, 3000 $mJ/cm^2$, or any value between those values. The electron beams may be used in such a manner that the dose of the electron beams is greater than or equal to 50 kGy and less than or equal to 100 kGy. Furthermore, the dose of the electron beams could be any value within that range, such as 55 kGy, 60 kGy, 65, kGy, 70 kGy, 75 kGy, 80 kGy, 85 kGy, 90 kGy, 95 kGy, or any value between those values.

The irradiation with ionizing radiation is directed to at least a first side S1 of the adhesive layer 2, which will be attached to the target structure, or a second side S2 of the adhesive layer 2, which is opposite to the first side S1. Additionally, the irradiation with ionizing radiation may be directed to both the first side S1 and the second side S2. In this case, the irradiation with ionizing radiation directed to the first side S1 may have a time overlap with the irradiation directed to the second side S2. In other words, the first side S1 and the second side S2 may be at least partially irradiated simultaneously. Preferably, the time overlap engages more than 50% of the irradiation period, more preferably substantially 100% of the irradiation period. The irradiation with ionizing radiation may also be directed to both of the sides without any time overlap.

The curing reaction of the adhesive layer 2 is encouraged by a time overlap even if the amount of the irradiation with ionizing radiation is less than the defined amount. The accumulated amount directed to each side can be greater than or equal to 500 mJ/cm$^2$ in the case that ultraviolet light having a wavelength range of 300 nm to 370 nm is directed to both the sides.

Preferably the adhesive sheet 10 is capable of maintaining a certain pressure-sensitive adhesive strength. In other words, preferably the adhesive sheet 10 is capable of maintaining a certain pressure-sensitive adhesive property strong enough to stay attached to the target structure until operators have completed the operation for attachment. The standard operation time is generally estimated to last from about thirty seconds to about twenty-four hours. Preferably the adhesive sheet 10 is capable of maintaining a certain pressure-sensitive adhesive strength strong enough to stay attached to the target structure at least within the standard operation time.

Preferably the pressure-sensitive adhesive strength of the adhesive sheet 10 is in the range of 0.01 N/inch to 50 N/inch, which is measured under a condition where the adhesive sheet 10 is attached to an aluminum plate. The adhesive sheet 10 is capable of being attached to the target structure if the lower limit of the pressure-sensitive adhesive strength is at least 0.01 N/inch. There is no upper limit, and the upper limit of the value may be set at values greater than 50 N/inch. Thus, the pressure-sensitive adhesive strength may be, for example, 0.01 N/inch, 0.1 N/inch, 0.5 N/inch, 1 N/inch, 5 N/inch, 10 N/inch, 15 N/inch, 20 N/inch, 25 N/inch, 30 N/inch, 35 N/inch, 40 N/inch, 45 N/inch, 50 N/inch, or greater, as well as any value between those values. More preferably, the pressure-sensitive adhesive strength can be maintained in the above range within the standard operation time.

The pressure-sensitive adhesive strength of the adhesive sheet 10, which is measured under the above condition, can be evaluated as the pressure-sensitive adhesive strength before the irradiating step because it does not drastically change after the irradiating step. Therefore, the pressure-sensitive adhesive strength of the adhesive sheet 10 between the preparing step and the irradiating step is preferably set in the range of 0.01 N/inch to 50 N/inch.

(Attaching Step)

The adhesive sheet 10 is attached to the target structure in the attaching step. After the attaching step, application of an active irradiation with ionizing radiation or an active heat to the adhesive sheet 10 will not be needed. Therefore, operators can save the time and effort needed for applying additional irradiation with ionizing radiation or a heating operation because they need not carry out additional curing treatments. The adhesive sheet 10 will have bonded to the target structure while operators are running or arranging the next operation. As explained above, the standard operation time is about 30 seconds to about 24 hours. The pressure-sensitive adhesive strength of the adhesive sheet 10 is preferably set in the range of 0.01 N/inch to 50 N/inch within the standard operation time.

The exemplary embodiment may include the shielding step or the preserving step.

(Shielding Step)

The adhesive sheet 10 is shielded from the irradiation with ionizing radiation in the shielding step so that the adhesive sheet 10 can be protected from unintentional irradiation by ionizing radiation. The shielding step can be carried out after the preparing step and before the irradiating step. For example, the adhesive sheet 10 may be put into a container capable of shielding it from ionizing radiation. The adhesive sheet 10 may be covered with a separation sheet capable of shielding it from ionizing radiation. The shielding step can be temporarily interrupted during the irradiating step, and can be restarted thereafter.

(Preserving Step)

The adhesive sheet 10 is preserved at a low temperature in the preserving step so that the curing reaction is brought under control after the irradiating step. The adhesive sheet 10 may be preserved at less than or equal to 0 degrees C., preferably at less than or equal to −20 degrees C. The preservation may take place at any temperature between −20 degrees C. and 0 degrees C., or a temperature lower than −20 degrees C. For example, the adhesive sheet 10 may be preserved in a refrigerator or freezer. The adhesive sheet 10 may be preserved in a container with a refrigerant. The preserving step can overlap with the shielding step in the case that the adhesive sheet 10 is preserved in a cool and dark place. The adhesive sheet 10 can be transported to a workspace with the adhesive sheet 10 being maintained in a cooled state, and can be used for the repairing or reinforcing operation thereafter.

The adhesive sheet 10 illustrated in FIGS. 1A to 4B will be attached to the target structure in accordance with the following method.

Figure 1A:
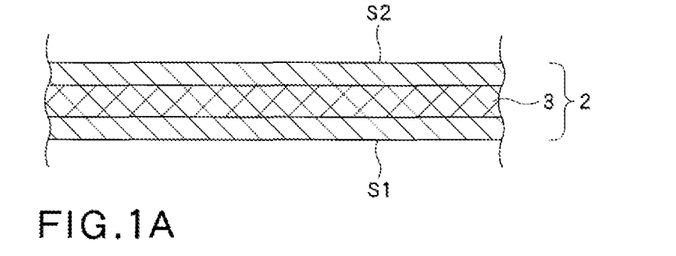
FIG. 1A is a cross-section view illustrating an adhesive sheet having an adhesive layer and a repairing or reinforcing material.
Figure 1B:
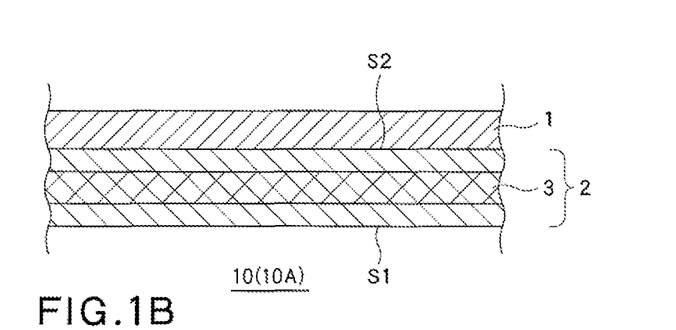
FIG. 1B is a cross-section view illustrating an adhesive sheet having an adhesive layer, a repairing or reinforcing material, and a separation sheet.
Figure 1C:
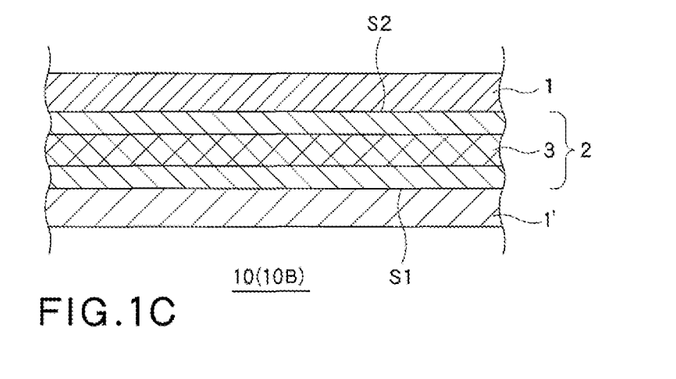
FIG. 1C is a cross-section view illustrating an adhesive sheet having an adhesive layer, a repairing or reinforcing material, and two separation sheets.

According to FIG. 1A and FIG. 1B, the adhesive sheet 10A is illustrated, which has the adhesive layer 2 and the repairing or reinforcing material 3 provided within the adhesive layer 2. In FIG. 1A, the first side S1 will be attached to the target structure. In FIG. 1B, the first side S1 will be also attached to the target structure, and then a separation sheet 1 provided on the second side S2 will be removed. According to FIG. 1C, the adhesive sheet 10B is illustrated, which has the adhesive layer 2 and the repairing or reinforcing material 3 provided within the adhesive layer 2. In FIG. 1C, firstly a separation sheet 1' provided on the first side S1 will be removed, then the first side S1 will be attached to the target structure, and finally a separation sheet 1 provided on the second side S2 will be removed. The adhesive sheet 10 (10A, 10B) may include other material such as a protective material or another repairing or reinforcing material. In the case of using other material, firstly the separation sheet 1 on the second side S2 in FIG. 1C will be removed, then the second side S2 will be attached to the other material, then the separation sheet 1' on the first side S1 will be removed, and finally the first side S1 will be attached to the target structure.

Figure 2A:
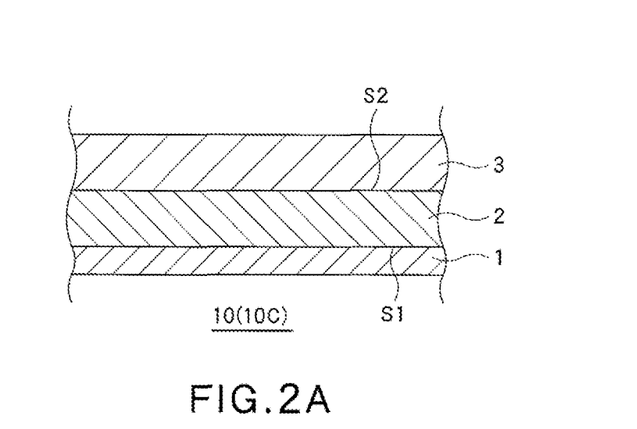
FIG. 2A is a cross-section view illustrating an adhesive sheet having an adhesive layer, a repairing or reinforcing material, and a separation sheet.
Figure 2B:
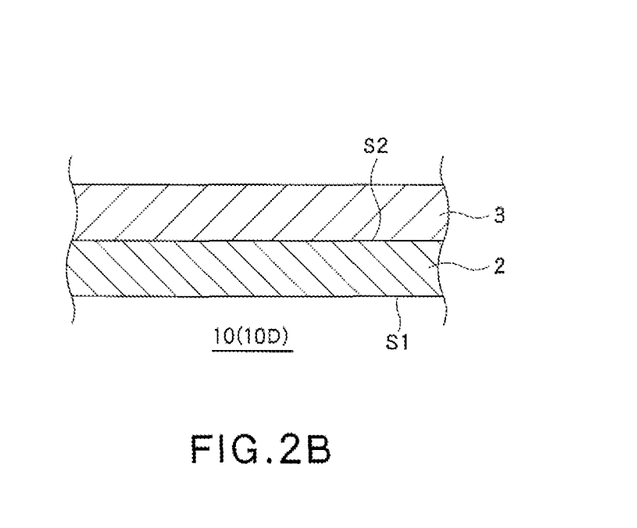
FIG. 2B is a cross-section view illustrating an adhesive sheet having an adhesive layer and a repairing or reinforcing material.

According to FIG. 2A and FIG. 2B, the adhesive sheet 10 (10C, 10D) is illustrated, which has the adhesive layer 2 and the repairing or reinforcing material 3 provided on the second side S2. The repairing or reinforcing material 3 may be provided directly or indirectly on the adhesive layer 2. In FIG. 2A, the separation sheet 1 provided on the first side S1 will be removed, and the first side S1 will be attached to the target structure. In FIG. 2B, the first side S1 will be attached to the target structure. According to these embodiments, operators can easily carry out a repairing or reinforcing operation because the repairing or reinforcing material 3 is provided on the adhesive layer 2 prior to the attaching step.

Figure 3A:
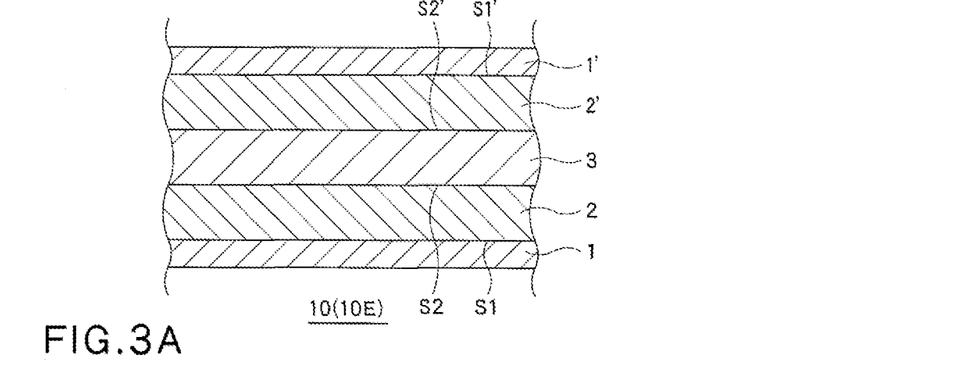
FIGS. 3A to 3C are cross-section views illustrating adhesive sheets having at least an adhesive layer and a repairing and reinforcing material.
Figure 3B:
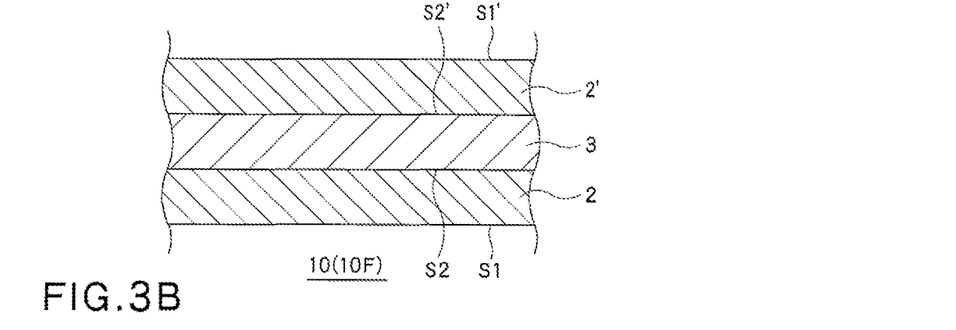
Figure 3C:
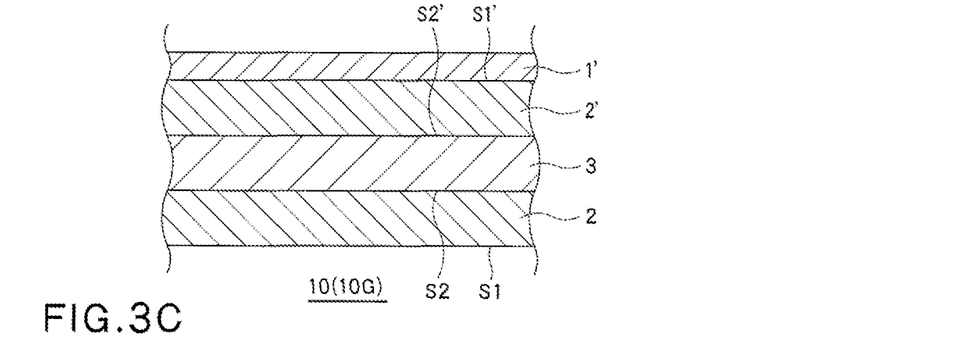

According to FIG. 3A, FIG. 3B, and FIG. 3C, the adhesive sheet 10 (10E, 10F, 10G) is illustrated, which has the first adhesive layer 2, the second adhesive layer 2', and the repairing or reinforcing material 3 provided between the second side S2 of the first adhesive layer 2 and the second side S2' of the second adhesive layer 2'. In FIG. 3A, firstly the first separation sheet 1 provided on the first side S1 will be removed, then the first side S1 will be attached to the target structure, then the second separation sheet 1' provided on the first side S1', which will be attached to a functional material in the case that the first side S1 is supposed to be attached to the target structure, will be removed, and finally the functional material will be attached to the first side S1'. In FIG. 3B, the first side S1 will be attached to the target structure. In FIG. 3C, the first side S1 will be attached to the target structure, and then the first separation sheet 1' will be removed. In FIGS. 3B and 3C, a functional material may be provided on the first side S1'. The adhesive layer (2, 2'), the repairing or reinforcing material 3, and the separation sheet (1, 1') are configured in order as illustrated in the figures, and each of them is provided directly or indirectly on the corresponding adjacent member.

Preferably the adhesive layer 2 is attached to the target structure by means of the pressure bonding adhesion properties with a roller press. Furthermore, the adhesive layer 2 can be pressed and heated by a heating roller, or can be pressed by a roller and then can be heated by hot air so that the curing reaction of the adhesive layer 2 is accelerated.

Examples of the repairing or reinforcing material 3 include aramid fiber, carbon fiber, vinylon fiber, or polyethylene terephthalate (PET) fiber used for reinforcement. Examples of the repairing or reinforcing material 3 include an advertising sheet, a coated sheet, a waterproof sheet, a water absorbing sheet, a water retaining sheet, an ultraviolet light resistant sheet, or a colored sheet used for repair with other functions. The functions directed to the objectives of reinforcement include, for example, concealing damage, correcting unevenness, enhancing strength, retaining water, protecting a surface, or decorating a surface.

A primer agent may be applied to the target structure before the attaching step. The primer agent can improve adhesion of the adhesive layer 2 to the target structure. For example, ALPRON W301 (manufactured by Nichibei Resin Co., Ltd.), or Primer II for reinforced concrete (manufactured by Mizutani Paint Co., Ltd.) can be used. The primer agent can be applied to the target structure in the range of about 1 μm to 1 mm in thickness.

Operators can reduce the time and effort needed for repairing or reinforcing a target structure by using the adhesive sheet 10. Operators can easily attach the adhesive sheet 10 to the target structure by irradiating at least the first side (S1, S1') with ionizing radiation even if the adhesive sheet 10 itself does not have ionizing radiation permeability. Additionally, operators can further reduce the time and effort by irradiating the adhesive sheet 10 with ionizing radiation in the Roll-to-Roll manner on level ground or in a wide workspace.

[Adhesive Sheet]

One exemplary embodiment is an adhesive sheet and will be explained below. The adhesive sheet 10 will be attached to the target structure, and can be used for repairing or reinforcing it. The adhesive sheet 10 includes the adhesive layer 2, the separation sheet 1 provided on at least the first side S1 of the adhesive layer 2, and the repairing or reinforcing material 3 configured to support the adhesive layer 2. The adhesive layer 2 contains an ionizing radiation curable resin and a compound configured to release a polymerization initiator by the irradiation with ionizing radiation.

(Adhesive Layer)

The adhesive layer 2 has pressure-sensitive adhesive properties at least before the irradiation with ionizing radiation, and will have bonding adhesive properties after the irradiation with ionizing radiation. The adhesive layer 2 contains a liquid epoxy resin or solid epoxy or both, which are ionizing radiation curable resins, and a curing agent capable of curing the liquid epoxy and/or the solid epoxy resin. The adhesive layer 2 may include a delay-curing adhesive, the curing reaction of which gradually proceeds after the irradiation with ionizing radiation. The adhesive layer 2 can be attached to the target structure by using the pressure-sensitive adhesive properties. As a result, the adhesive layer 2 can be attached to the target structure after the irradiating step. The adhesive layer 2 can be removed from the target structure and then can be attached to it again within a certain period of time because the curing reaction of the adhesive layer 2 gradually proceeds after the irradiating step. The adhesive layer 2 can avoid falling owing to bonding adhesive properties even if the surface of the target structure is vertical to the ground or the adhesive layer 2 is placed on the ceiling of the target structure.

The adhesive layer 2 is attached to the target structure in such a manner that the first side S1 bonds to the target structure. Additionally, other materials such as a protective material, or another repairing or reinforcing material may be provided on the second side S2. In the present application, "adhesive" means the possession of both pressure-sensitive adhesive properties and bonding adhesive properties, and "pressure-sensitive adhesion" means a temporary bonding phenomenon and is sometimes distinguished from "bonding adhesion," which means a permanent bonding phenomenon (Physicochemical Dictionary, 5th version, Iwanami Shoten).

The adhesive layer 2 is formed like a sheet or layer by using a composition for an adhesive layer formation. The composition for an adhesive layer formation refers to the composition for forming the adhesive layer 2 by the method such as coating. The composition for an adhesive layer formation contains an acrylic resin, a liquid epoxy resin and solid epoxy, which are ionizing radiation curable resins, and a curing agent capable of curing the liquid epoxy resin and/or the solid epoxy resin.

The adhesive layer 2 contains chemical species capable of causing delay-curing. Some methods of causing delay-curing have been proposed. The method of using the chemical species capable of releasing a polymerization initiator by irradiation with ionizing radiation can be used.

An example of the chemical species used in delay-curing includes the chemical species capable of gradually generating a polymerization initiator (e.g., a base) by irradiation with ionizing radiation as well as a photobase generator.

An example of the above photobase generator is the chemical species which may gradually generate a base by irradiation with ionizing radiation. For example, the above photobase generator will be represented by the following chemical formula, and preferably generate a base by ultraviolet light or electron beams.

In the following chemical formula, R1 and R2 each independently represent hydrogen or a monovalent organic group and may be the same or different; R1 and R2 may be combined to form a cyclic structure, provided that at least one of R1 and R2 represents a monovalent organic group; and R3, R4, R5, and R6 each represent hydrogen, a halogen, or a monovalent organic group and may be the same or different, or two or more of R3, R4, R5, and R6 may be combined to form a cyclic structure.

[Chemical Formula 1]

The photobase generator generates a base upon irradiation with ionizing radiation such as ultraviolet light or electron beams, and the generation of a base is accelerated. Accordingly, a base can be effectively generated by irradiation with ionizing radiation. The photobase generator refers to an agent which does not exhibit activity under ordinary temperatures and pressure conditions but generates a base upon exposure, for example, to ionizing radiation as an external stimulus. The photobase generator has the above specific structure. Therefore, upon irradiation with ionizing radiation, a (—CH=CH—C(=O)—) moiety in the chemical formula is isomerized to a cis form, and further, upon heating, cyclization occurs to generate an amine NHR1R2 that is a base.

The content of the curing agents which can cure the adhesive layer 2 by irradiating with ionizing radiation is preferably greater than or equal to 1% by mass and less than or equal to 10% by mass based on the total amount of the liquid epoxy resin and the solid epoxy resin in the case that the curing agents initiate cationic polymerization. The content may be any value within the range of 1% to 10% by mass, such as 2%, 3%, 4%, 5%, 6%, 7%, 8%, 9%, or any value therebetween. Further, the content of the curing agents is preferably greater than or equal to 0.8 and less than or equal to 1.2 equivalents based on the epoxy equivalent of the liquid epoxy resin and the solid epoxy resin in the case that the curing agents react with epoxy resins in an equivalent reaction, for example, phenol-based curing agents and acid anhydride-based curing agents. The content may be any value within the range of 0.8 to 1.2 equivalents, such as 0.9, 1. 1.1, or any value therebetween.

The thickness of the adhesive layer 2 is preferably 150 μm to 500 μm, more preferably 150 μm to 300 μm. The thickness may be any value within the range of 150 μm to 500 μm, such as 200 μm, 300 μm, 400 μm, or any value therebetween.

The adhesive layer 2 may be formed on the separation sheet 1, which is, for example, subjected to easy separation treatment. The separation sheet 1 will be explained below in detail.

The composition for an adhesive layer formation is prepared by mixing the above materials and stirring the mixture for dissolution. The stirrer usable for stirring is not particularly limited, and examples thereof include conventional kneading and dispersing machines, for example, twin roll mills, three-roll mills, pebble mills, trommels, high-speed impeller dispersants, high-speed stone mills, high-speed impact mills, high-speed mixers, ribbon blenders, cokneaders, intensive mixers, tumblers, blenders, dispersant, homogenizers, and ultrasonic dispersants.

The composition for an adhesive layer formation may be coated by any method without particular limitation. Examples of printing methods include gravure printing, flexo printing, and offset printing. Coating methods include, for example, roll coating, reverse coating, Komma coating, knife coating, die coating, and gravure coating.

The drying of the coated composition for an adhesive layer formation is preferably carried out under such conditions that the solvent contained in the composition for an adhesive layer formation can be satisfactorily volatilized and, at the same time, a lowering in pressure-sensitive adhesive properties due to excessive acceleration of curing of the liquid epoxy resin and the solid epoxy resin does not occur. The drying is generally carried out by holding at a temperature of 50 to 100 degrees C. for two to twenty minutes.

(Configuration of Adhesive Sheet)

As illustrated in FIG. 1B, FIG. 1C, and FIG. 2A, the adhesive sheet 10 (10A, 10B, 10C) includes the adhesive layer 2, and the separation sheet 1 provided on the first side S1 and/or the second side S2. The separation sheet 1 may be provided on one side as illustrated in the adhesive sheet 10 (10A, 10C), or the separation sheets (1, 1') may be respectively provided on both sides of the adhesive layer 2 as illustrated in the adhesive sheet 10B. According to the adhesive sheets 10A and 10B, the adhesive sheet contains the repairing or reinforcing material 3 within the adhesive layer 2. In this case, the repairing or reinforcing material 3 may be at least partially saturated with the adhesive layer 2, or may be covered with the adhesive layer 2.

As illustrated in FIG. 2A and FIG. 2B, the adhesive sheet 10 (10C, 10D) includes the adhesive layer 2, and the repairing or reinforcing material 3 provided on the second side S2. In this case, the adhesive sheet 10 may include the separation sheet 1 provided on the first side S1 as in the adhesive sheet 10C, or the first side S1 may be free as shown for the adhesive sheet 10D.

As illustrated in FIG. 3A to FIG. 3C, the adhesive sheet includes the first adhesive layer 2, the repairing or reinforcing material 3 provided on the first adhesive layer 2, and the second adhesive layer 2' provided on the repairing or reinforcing material 3. The separation sheet 1' may be provided on the second adhesive layer 2' as illustrated in FIG. 3A and FIG. 3C. Alternatively, the first side (S1, S1') may be free as illustrated in FIG. 3B.

The component of the second adhesive layer 2' may be substantially the same as the component of the first adhesive layer 2, or may be different from the component of the first adhesive layer 2. The former is more preferable from the viewpoint of manufacturing costs.

(Separation Sheet)

The separation sheet (1, 1') is provided on one side (S1 or S2) or both sides (S1 and S2) as illustrated in FIGS. 1B, 1C, and 2A. The separation sheet (1, 1') will cover and protect the first side S1 or both the first side S1 and the second side S2 until the attaching step. The separation sheet 1 may be provided on the second side S2 as illustrated in FIG. 1B. The separation sheet (1, 1') may be respectively provided on the first side S1 and the second side S2 as illustrated in FIG. 1C.

The separation sheet 1 may be provided on the first side S1 as illustrated in FIG. 2A and FIG. 3A. Furthermore the separation sheet 1' may be provided on the first side S1' of the second adhesive layer 2' as illustrated in FIG. 3A and FIG. 3C.

The side of the separation sheet (1, 1'), which is configured to be directed to the adhesive layer (2, 2'), is preferably subjected to easy separation treatment. The separation sheet (1, 1') subjected to easy-separation treatment can easily be separated after the attaching step.

The separation sheet (1, 1') is not particularly limited, and a wide variety of sheets can be used, as long as the separation sheet (1, 1') has strength and flexibility sufficient that the separation sheet (1, 1') can protect the adhesive layer 2.

The irradiation with ionizing radiation to the adhesive layer 2 can be carried out through the separation sheet (1, 1') in the case that the separation sheet has ionizing radiation permeability.

The irradiation with ionizing radiation to the adhesive layer 2 can be carried out directed to both sides of the adhesive layer 2 through both of the separation sheets (1, 1') with a time overlap in the case that both of the separation sheets (1, 1') have ionizing radiation permeability.

Furthermore, an indicator may be provided with the separation sheet, which may provide a signal corresponding to, for example, the irradiation period, the irradiation intensity, or the irradiation dose by means of the indicator changing its color according to the level of each of these values. As a result, operators can monitor the condition of the adhesive layer 2 by checking the indicator.

Preferably the adhesive sheet 10 will be preserved in a container such as a bag or box capable of preventing ionizing radiation from penetrating inside in the case that the separation sheet (1, 1') has ionizing radiation permeability.

The separation sheet capable of shielding the adhesive layer from ionizing radiation can be used. In this case, the curing reaction of the adhesive layer 2 will be prevented from being initiated even if unintentional ionizing radiation is directed to the adhesive sheet 10. For example, the sheet with a thin film containing carbon or metal can be used as the above separation sheet. In particular, providing the adhesive sheet 10, from which one separation sheet is removed and another separation sheet capable of shielding the adhesive layer from ionizing radiation is left, can maintain the adhesive sheet 10 in a good condition even if a long time has passed since the irradiating step. Furthermore, providing the adhesive sheet 10 with the separation sheet (1, 1'), which has a concavity and convexity pattern or holes, can make it possible to easily attach the separation sheet to the adhesive layer 2 without causing air bubbles between the separation sheet (1, 1') and the adhesive layer 2.

Preferably the adhesive sheet 10 may be preserved in a container capable of shielding the adhesive layer from ionizing radiation even though the separation sheet capable of shielding it from ionizing radiation is used.

In the case that the separation sheet (1, 1') is provided respectively on both sides of the adhesive layer, the separation sheet capable of shielding the adhesive layer from ionizing radiation may be on one side, and the separation sheet incapable of shielding it from ionizing radiation may be on the other side. In the case the adhesive sheet 10 is rolled up or stacked in such a manner that the separation sheet capable of shielding the adhesive layer 2 from ionizing radiation is configured to be on the outer side, the separation sheet on the outer side can shield the adhesive layer 2 from ionizing radiation. In this case, the irradiation with ionizing radiation can be directed to the adhesive layer 2 through the separation sheet on the inner side. Additionally, ionizing radiation will go through the adhesive layer 2 on the inner side, then will be reflected by the separation sheet on the outer side, and then will go through the adhesive layer 2 again. Therefore, ionizing radiation can be utilized. The sheet with a thin film containing metal such as aluminum can be used as the separation sheet capable of reflecting the ultraviolet light as ionizing radiation.

In the case that the separation sheets (1, 1') are provided on both sides of the adhesive sheet 10, the adhesive sheet 10 may be attached to the target structure after one separation sheet is removed, and the other separation sheet may be left on the adhesive sheet 10 for a certain period. The other separation sheet can protect the attached area from rain or wind until the adhesive layer 2 has been fixed to the target structure. Examples of the separation sheet (1, 1') include a sheet having a metal or metal oxide thin film such as aluminum, a silicon or silicon oxide thin film, a fine particle containing layer including particles such as titanium oxide, and a hard coat layer including strengthen resin. The separation sheet (1, 1') is not limited to these examples. The above layers can improve durability of the separation sheet (1, 1') against abrasion. The gas barrier layer, which has a metal or metal oxide thin film such as aluminum, or a silicon or silicon oxide thin film, can avoid the cure inhibition of the adhesive layer 2 due to components in the air. Preferably the separation sheet having the gas barrier layer can be used in order to prevent a base generated from a photobase generator from being neutralized.

Examples of the separation sheet (1, 1') include a heat transfer layer or a heat generation layer. The heat transfer layer and the heat generation layer can prevent the adhesive layer 2 from damage even if a heating operation is carried out in order to accelerate the curing reaction.

(Repairing or Reinforcing Material)

The repairing or reinforcing material 3 may be provided within the adhesive layer 2, or may be at least partially saturated with the adhesive layer 2 as illustrated in FIGS. 1A to 1C. Furthermore, the repairing or reinforcing material 3 may be provided directly or indirectly on the adhesive layer 2 as illustrated in FIG. 2A, FIG. 2B, and FIGS. 3A to 3C.

Examples of the repairing or reinforcing material include one or more selected from the group consisting of polyester fiber, polyamide fiber, aramid fiber, vinylon fiber, carbon fiber, glass fiber, and polyolefin fiber. Preferably polyester fiber, polyamide fiber, aramid fiber, vinylon fiber, and polyolefin fiber can be used from the viewpoint of light weight and strength. These fibers may be blended, or may be woven. Furthermore, these fibers may be laminated. The repairing or reinforcing material is not limited to these examples. The functions directed to the objectives of reinforcement include, for example, concealing damages, correcting unevenness, improving strength, retaining water, protecting a surface, or decorating a surface.

Additional examples of the repairing or reinforcing materials include a waterproof sheet, a water absorbing sheet, an ultraviolet light resistant sheet, a water retaining sheet, or a colored sheet. Furthermore, the repairing or reinforcing material may comprise at least one selected from these sheets and a material such as fiber.

Preferably the repairing or reinforcing material 3 has a strength (a reinforcement strength) high enough to support separated concrete pieces or concrete pieces that are likely to be separated, for example, when a part of a concrete structure has been separated or is likely to be separated. The strength is preferably greater than or equal to 1500 N at a displacement greater than or equal to 10 mm, for example, in a punching test specified in former Japan Highway Public Corporation (East Nippon Expressway Company Limited, Central Nippon Expressway. Co., Ltd., and West Nippon Expressway Co., Ltd.).

The thickness of the repairing or reinforcing material 3 is, for example, in the range of 0.01 mm to 0.1 mm. The thickness can be less than 0.01 mm or greater than 0.1 mm, and can be any value in between these values, such as 0.02 mm, 0.03 mm, 0.04 mm, 0.05 mm, 0.06 mm, 0.07 mm, 0.08 mm, and 0.09 mm.

(Others)

Figure 4A:
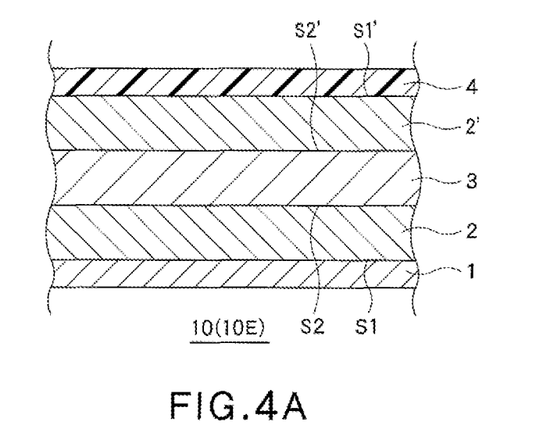
FIGS. 4A and 4B are cross-section views illustrating adhesive sheets having a functional material in place of the separation sheet.
Figure 4B:
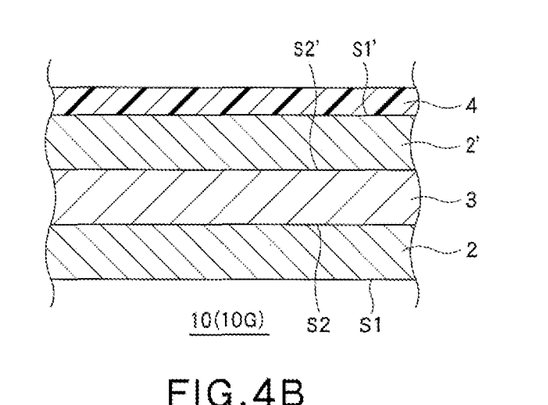

Furthermore, as illustrated in FIGS. 3A to 3C, since the adhesive layer (2, 2') is provided on respective sides of the repairing or reinforcing material 3, the adhesive sheet 10 (10E, 10F, 10G) can function like an adhesive double coated tape. Concrete can be applied to the first side S1 of the adhesive layer 2 in the adhesive sheet 10, and a functional material that will be described later can be applied to the first side S1' of the second adhesive layer 2'. As illustrated in FIG. 4A and FIG. 4B, in the adhesive sheet 10E, 10G, the functional material 4, which is formed like a sheet or layer, may be provided in place of the separation sheet F.

The functional material 4 may have one or more functions such as light resistance, water resistance, antifouling properties, weathering resistance, impact resistance, scratch resistance, acid resistance, alkali resistance, and design.

According to the disclosed adhesive sheet, the time and effort needed for repair or reinforcement can be reduced and operators can efficiently carry out a repairing or reinforcing operation due to the provision of the adhesive sheet for repairing or reinforcing a target structure comprising: a first adhesive layer comprising an ionizing radiation curable resin and a compound configured to release a polymerization initiator by the irradiation of ionizing radiation, the first adhesive layer having a first side and a second side; a separation sheet provided on at least the first side of the adhesive layer; and a repairing or reinforcing material configured to support the first adhesive layer.

EXAMPLES

The preferred embodiments are further illustrated by the following examples. The present invention, however, is not limited to the following examples.

Example 1

An adhesive sheet corresponding to Example 1, as explained below, was prepared for the purpose of being attached to a concrete wall as a target structure. Furthermore, the adhesive sheet was rolled up in a roll shape and preserved in an opaque container so as to be shielded from unintentional ionizing radiation thereafter before the attaching step.

A pressure sensitive adhesive strength of the adhesive sheet before the irradiating step (also described as the "initial pressure sensitive adhesive strength" below) was evaluated at about 17 N/inch, which was measured in a condition in which the adhesive sheet was attached to an aluminum plate. The pressure sensitive adhesive strength was measured in accordance with the following procedures. Firstly, the adhesive sheet was cut into a size of 25 mm by 150 mm. Subsequently, a separation sheet on the first side of an adhesive layer was removed, and the first side was attached to the aluminum plate made of an aluminum alloy (A6061, plate size: 25 mm by 150 mm). Subsequently, the adhesive sheet was peeled back to 20 mm from one edge thereof by hand, and the pressure sensitive adhesive strength was measured in accordance with JIS Z 0237 (tensile speed: 300 mm/minute, peeling distance: 150 mm, peeling angle: 180 degrees) with a tensile tester (manufactured by A & D Co., Ltd., model: RTF-1150H).

A stationary ionizing radiation irradiation device was set on the level ground near a work area. The adhesive sheet was delivered in sequence from a roll. The adhesive sheet was irradiated with ionizing radiation while the adhesive sheet was passing through an irradiation unit of the irradiation device. Then, the adhesive sheet was rolled up again in a roll shape. The adhesive sheet was irradiated using the ultraviolet light as ionizing radiation. The wavelength of the ultraviolet light was in the range of 300 nm to 370 nm. The accumulated amount of light was 800 mJ/cm$^2$. The ultraviolet light was directed to the first side. The pressure sensitive adhesive strength of the adhesive sheet after the irradiating step, which was measured in the same manner as the above, was substantially the same as the strength before the irradiating step.

The adhesive sheet was delivered again, and then was cut into pieces having a size of 1 m$^2$ each. One piece of the adhesive sheet was transported to the predetermined construction site. A separation sheet was removed from the adhesive sheet. The first side of the adhesive layer was attached to a concrete wall, and the adhesive layer was pressed by a hand roller. The pressure sensitive adhesive strength of the adhesive sheet before the attaching step, which was measured in the same manner as the above, was substantially the same as that before the irradiating step. Therefore, the pressure sensitive adhesive strength of the adhesive sheet turned out to be greater than or equal to about 10 N/inch after the irradiating step.

No additional curing treatments were carried out after the attaching step. The adhesive sheet was left for seven days under the ambient temperature of the target structure. In this case, the ambient temperature was between 18 degrees C. and 25 degrees C. After seven days, a laying performance was evaluated based on a visual inspection. When a test piece was visually observed, a laying performance was evaluated to be "A" (i.e., "Excellent") if an adhesive sheet could be firmly attached to a target structure and if unevenness could not be visually observed, and to be "B" (i.e., "Poor") if an adhesive sheet could not be attached to a target structure due to lack of a pressure sensitive adhesive strength or if unevenness could be visually observed.

Another piece of the adhesive sheet was attached to a concrete plate in the same manner as the above for the purpose of testing bonding strength. The concrete plate with the adhesive sheet was cut into 40 mm each by a concrete cutter. Subsequently, the bonding strength was evaluated in accordance with the "test method punching of spalling prevention" 2004; test JHS-424. As a result, the bonding strength was evaluated to be about 2 N/mm$^2$, which was sufficient to meet practical levels.

Subsequently, the anti-spalling performance was evaluated in accordance with the "test method punching" Japan Highway Public Corporation research standard; test JHS-424 2004. As a result, the anti-spalling performance was evaluated to be greater than 5 IN, which was sufficient to meet practical levels. The anti-spalling performance was evaluated at "A" (i.e. "Excellent") if the anti-spalling performance met practical levels, and at "B" (i.e. "Poor") if the anti-spalling performance did not meet practical levels. In Table 1 below, "A" is shown for the anti-spalling performance of this example.

One implementation of this embodiment makes it possible for operators to efficiently conduct repairing or reinforcing work and efficiently reduce the total operation time because operators can run the next operation or can arrange the next operation while leaving the adhesive sheet attached to a target structure without special treatments. In particular, one implementation of this embodiment is useful in a situation in which operators have to efficiently and quickly conduct repairing or reinforcing work (e.g., night-time tunnel construction, railway construction, and so on).

(Adhesive Sheet)

A 38 µm-thick transparent polyester film (manufactured by Mitsui Chemicals Tohcello, Inc., trade name: SP-PET-03) was provided as a separation sheet having one surface subjected to easy-separation treatment with a silicon-based separating agent. A composition as described below was coated on the surface of the separation sheet subjected to easy-separation treatment so as to be 100 µm-thick by an applicator, and two identical sets were made. The two coated separation sheets were dried in a drying oven at 80 degrees C. for two minutes in order to form an adhesive layer thereon. Subsequently, carbon fiber as a repairing or reinforcing material (manufactured by Toho Tenax Co., Ltd., trade name: W-3101) was provided on one of the adhesive layers, and was pressed by a 2 kg-roller at room temperature. Subsequently, carbon fiber was also provided on the other adhesive layer, and two sets were pressed together by the 2 kg-roller on a hot plate set at 60 degrees C. so that the carbon fibers were in contact with each other. By this means, the adhesive sheet corresponding to Example 1 was prepared having the repairing or reinforcing sheet saturated with the adhesive layer.

(Composition for an Adhesive Layer Formation)

| | |
|---|---|
| Liquid epoxy resin (bisphenol A epoxy resin, Epoxy equivalent: 190 g/eq., Mw: 380, manufactured by Mitsubishi Chemical Corporation, trade name; jER828) | 100 parts by mass |
| Curing agent having a mercapto group (pentaerythritol tetrakis 3-mercapto propionate, viscosity 400 to 500 mPaS/25 degree, Mercaptan equivalent: 125 to 137 g/eq., manufactured by Mitsubishi Chemical Corporation, trade name; QX40) | 70 parts by mass |
| Acrylic resin (modified methyl methacrylate-butyl acrylate-methyl methacrylate triblock copolymer with amide group derived from acrylamide, Tg; −42 degrees C., manufactured by Arkema Inc., trade name: M22N) | 50 parts by mass |
| Photobase generating agent A (see the synthesis method described below) | 5 parts by mass |
| Diluting solvent (ethyl acetate, manufactured by DIC Graphics Corporation) | 100 parts by mass |

(Synthesis of Photobase Generator A)

First, 15 mL of methanol was placed in a 100-mL flask, and 2.00 g of potassium carbonate was added thereto. Subsequently, 10 mL of methanol was placed in a 50-mL flask. Ethoxycarbonylmethyl (triphenyl) phosphonium bromide (manufactured by Tokyo Chemical Industry Co., Ltd.) (2.67 g (6.2 mmol)) and 1.7 g (6.2 mmol) of 2-hydroxy-4-(5-ethylhexyloxy)-5-ethylbenzaldehyde were added thereto and dissolved in the mixture. The thoroughly stirred methanol solution of potassium carbonate was then slowly added dropwise to the solution, the mixture was stirred for 3 hours, and the completion of the reaction was confirmed by TLC (Thin-Layer Chromatography). Subsequently, potassium carbonate was removed by filtration, followed by concentration under the reduced pressure. After the concentration, 50 mL of a 1 N aqueous sodium hydroxide solution was added, and the mixture was stirred for one hour. After the completion of the reaction, triphenylphosphine oxide was removed by filtration, concentrated hydrochloric acid was added dropwise thereto, and the reaction solution was acidified. The precipitates were collected by filtration and were washed with a small amount of chloroform to give 1.7 g of 2-hydroxy-4-(5-ethylhexyloxy)-5-ethylcinnamic acid. Subsequently, 1.0 g (3.19 mmol) of 2-hydroxy-4-(5-ethylhexyloxy)-5-ethylcinnamic acid was dissolved under a nitrogen atmosphere in 10 mL of dehydrated tetrahydrofuran in a 100-mL three-necked flask. 1-Ethyl-3-(3-dimethylaminopropyl)carbodiimide hydrochloride (manufactured by Tokyo Chemical Industry Co., Ltd.) (0.73 g (3.83 mmol, 1.2 eq.) was added to the solution under an ice bath, and 30 minutes after the addition, 129 mg (1.52 mmol, 0.95 eq.) of piperidine (manufactured by Tokyo Chemical Industry Co., Ltd.) was added as an amine thereto, followed by stirring overnight. After the completion of the reaction, the reaction solution was concentrated, and the concentrate was dissolved in water. The solution was extracted with chloroform. The extract was washed with an aqueous hydrogen carbonate solution, 1 N hydrochloric acid, and saturated brine, was dried over sodium sulfate, and was then concentrated to give 1.0 g of photobase generator A represented by formula (I):

[Chemical formula I]

(I)

Example 2

An adhesive sheet corresponding to Example 2 was prepared in the same manner as in Example 1 except using the composition described below. Properties of the adhesive sheet were evaluated in the same manner as in Example 1.

(Composition for an Adhesive Layer Formation)

| | |
|---|---|
| Solid epoxy resin (bisphenol A epoxy resin, Mw: 500, manufactured by Mitsubishi Chemical Corporation, trade name; jER1009) | 100 parts by mass |
| Curing agent having a mercapto group (pentaerythritol tetrakis 3-mercapto propionate, viscosity 400 to 500 mPaS/25 degree, Mercaptan equivalent: 125 to 137 g/eq., manufactured by Mitsubishi Chemical Corporation, trade name; QX40) | 7.6 parts by mass |
| Acrylic resin (modified methyl methacrylate-butyl acrylate-methyl methacrylate triblock copolymer with amide group derived from acrylamide, Tg; −42 degrees C., manufactured by Arkema Inc., trade name: M22N) | 50 parts by mass |
| Photobase generating agent A (see the synthesis method described above) | 5 parts by mass |
| Diluting solvent (ethyl acetate, manufactured by DIC Graphics Corporation) | 100 parts by mass |

Example 3

An adhesive sheet corresponding to Example 3 was prepared in the same manner as Example 1 except replacing the 50 μm-thick aluminum foil with carbon fiber as a repairing or reinforcing sheet. Properties of the adhesive sheet were evaluated in the same manner as in Example 1.

Comparative Example 1

An adhesive sheet corresponding to Comparative Example 1 was prepared in the same manner as in Example 1 except using the composition described below. Properties of the adhesive sheet were evaluated in the same manner as in Example 1.

(Composition for an Adhesive Layer Formation)

| | |
|---|---|
| Solid epoxy resin (bisphenol A epoxy resin, Mw: 500, manufactured by Mitsubishi Chemical Corporation, trade name; jER1009) | 50 parts by mass |
| Curing agent (dicyandiamide, manufactured by Mitsubishi Chemical Corporation, trade name; DICY7) | 10 parts by mass |
| Curing promoter (amine adduct-based curing promoter, manufactured by Ajinomoto Fine-Techno Co., Inc., trade name: AJICURE MYH) | 5 parts by mass |
| Diluting solvent (ethyl acetate, manufactured by DIC Graphics Corporation) | 100 parts by mass |

Comparative Example 2

An adhesive sheet corresponding to Comparative Example 2 was prepared in the same manner as in Example 1 except using the composition described below. Properties of the adhesive sheet were evaluated in the same manner as in Example 1.

(Composition for an Adhesive Layer Formation)

| | |
|---|---|
| Solid epoxy resin (bisphenol A epoxy resin, Mw: 500, manufactured by Mitsubishi Chemical Corporation, trade name; jER1009) | 50 parts by mass |
| Liquid epoxy resin (bisphenol A epoxy resin, Epoxy equivalent: 190 g/eq., Mw: 380, manufactured by Mitsubishi Chemical Corporation, trade name; jER828) | 50 parts by mass |
| Curing agent (dicyandiamide, manufactured by Mitsubishi Chemical Corporation, trade name; DICY7) | 10 parts by mass |
| Curing promoter (amine adduct-based curing promoter, manufactured by Ajinomoto Fine-Techno Co., Inc., trade name: AJICURE MYH) | 5 parts by mass |
| Diluting solvent (ethyl acetate, manufactured by DIC Graphics Corporation) | 100 parts by mass |

[Results]

The evaluating results are illustrated in Table 1. According to Table 1, the operation corresponding to Example 1 turned out to have the most significant advantages regarding the laying performance and the anti-spalling performance. Furthermore, the adhesive sheet corresponding to Example 1 turned out to have the highest values regarding the initial pressure sensitive adhesive strength and the bonding strength.

TABLE 1

| | Initial pressure sensitive adhesive strength (N/inch) | Laying performance | Bonding strength (N/mm2) | Anti-spalling performance |
|---|---|---|---|---|
| Example 1 | 17 | A | 2 | A |
| Example 2 | 0.05 | A | 1.5 | A |
| Example 3 | 17 | A | 1.5 | A |
| Comparative Example 1 | 0.02 | B (not laid) | — | — |
| Comparative Example 2 | 5 | A | 0.3 (uncured) | B |

What is claimed is:

1. A method of repairing or reinforcing a target structure comprising the steps of:
   preparing an adhesive sheet comprising at least an adhesive layer having a first side and a second side, and a repairing or reinforcing material;
   irradiating the adhesive sheet with ionizing radiation so as to initiate a curing reaction of the adhesive layer; and
   attaching the first side of the adhesive layer to the target structure after the irradiating step.

2. The method of repairing or reinforcing a target structure according to claim 1, wherein the curing reaction of the adhesive layer continues under an ambient temperature of the target structure after the attaching step.

3. The method of repairing or reinforcing a target structure according to claim 1, wherein the ionizing radiation is directed to at least the first side of the adhesive layer.

4. The method of repairing or reinforcing a target structure according to claim 3, wherein the irradiating of the adhesive sheet includes directing the ionizing radiation to one of the first side and the second side of the adhesive layer and directing the ionizing radiation to the other of the first side and the second side such that the first side and the second side are at least partially irradiated simultaneously.

5. The method of repairing or reinforcing a target structure according to claim 4, wherein an ultra violet light having a wavelength in the range of 300 nm to 370 nm is used in the ionizing radiation.

6. The method of repairing or reinforcing a target structure according to claim 5, wherein an accumulated amount of the ultra violet light directed to each of the first and second sides is greater than or equal to 500 mJ/cm$^2$.

7. The method of repairing or reinforcing a target structure according to claim 1, further comprising the step of: shielding the adhesive sheet from the irradiation with the ionizing radiation after the preparing step.

8. The method of repairing or reinforcing a target structure according to claim 1, further comprising the step of: preserving the adhesive sheet at a low temperature after the irradiating step.

9. The method of repairing or reinforcing a target structure according to claim 1, further comprising the step of: providing a functional material on the second side of the adhesive layer after the attaching step.

10. The method of repairing or reinforcing a target structure according to claim 1, further comprising the steps of: rolling up the adhesive sheet irradiated with the ionizing radiation; unrolling the adhesive sheet; cutting off a piece of the unrolled adhesive sheet; and transporting the piece to a work site.

11. The method of repairing or reinforcing a target structure according to claim 1, wherein the repairing or reinforcing material is provided within the adhesive layer.

12. The repairing or reinforcing method according to claim 11, wherein the repairing or reinforcing material is at least partially saturated with the adhesive layer.

13. The method of repairing or reinforcing a target structure according to claim 1, wherein the repairing or reinforcing material is provided directly on the second side of the adhesive layer.

14. The method of repairing or reinforcing a target structure according to claim 1, wherein the adhesive layer comprises a light delay-curing adhesive.

15. The method of repairing or reinforcing a target structure according to claim 1, wherein the pressure sensitive adhesive strength of the adhesive layer between the irradiating step and the attaching step is greater than or equal to 0.01 N/inch and less than or equal to 50 N/inch.

16. A method of producing a repaired or reinforced target structure comprising the steps of: determining an area to be repaired or reinforced on the target structure; and repairing or reinforcing the area by the method according to claim 1.

17. The method of producing a repaired or reinforced target structure according to claim 16, further comprising the step of applying a primer agent to the target structure before the repairing or reinforcing step.

* * * * *